United States Patent
Mignone et al.

(10) Patent No.: US 10,651,924 B2
(45) Date of Patent: May 12, 2020

(54) SYSTEM, DECODER, AND METHOD FOR TRANSMITTING SATELLITE SIGNALS

(71) Applicant: RAI RADIOTELEVISIONE ITALIANA S.P.A., Rome (IT)

(72) Inventors: Vittoria Mignone, Piobesi Torinese (IT); Bruno Sacco, Turin (IT); Alberto Morello, Turin (IT)

(73) Assignee: RAI RADIOTELEVISIONE ITALIANA S.P.A., Rome (RM) (IT)

( * ) Notice: Subject to any disclaimer, the term of this patent is extended or adjusted under 35 U.S.C. 154(b) by 0 days.

(21) Appl. No.: 14/906,840

(22) PCT Filed: Jul. 21, 2014

(86) PCT No.: PCT/IB2014/063268
§ 371 (c)(1),
(2) Date: Jan. 21, 2016

(87) PCT Pub. No.: WO2015/011626
PCT Pub. Date: Jan. 29, 2015

(65) Prior Publication Data
US 2016/0182141 A1    Jun. 23, 2016

(30) Foreign Application Priority Data
Jul. 25, 2013    (IT) ............................... TO2013A0630

(51) Int. Cl.
*H04B 7/185*    (2006.01)
(52) U.S. Cl.
CPC ..... *H04B 7/18513* (2013.01); *H04B 7/18534* (2013.01); *H04B 7/18539* (2013.01)

(58) Field of Classification Search
CPC .................................................. H04B 7/18513
See application file for complete search history.

(56) References Cited

U.S. PATENT DOCUMENTS

| | | | | |
|---|---|---|---|---|
| 6,301,231 B1* | 10/2001 | Hassan | .............. | H04B 7/18534 342/352 |
| 9,979,464 B1* | 5/2018 | Chen | .................. | H04B 7/18517 |
| 2005/0041661 A1* | 2/2005 | Thorsteinson | ..... | H04N 21/4305 370/389 |

(Continued)

FOREIGN PATENT DOCUMENTS

EP    2 343 860 A2    7/2011

OTHER PUBLICATIONS

International Search Report and Written Opinion dated Nov. 20, 2014, issued in PCT Application No. PCT/IB2014/063268, filed Jul. 21, 2014.

*Primary Examiner* — John D Blanton
(74) *Attorney, Agent, or Firm* — Workman Nydegger

(57) ABSTRACT

The invention relates to a system, a receiver and a method for satellite signal transmission, wherein the method includes the steps of grouping the signals into a data stream, splitting the data stream into at least a first and one or more second packets, transmitting the first packet via a first transmission channel (Ch #1), transmitting the one or more second packets via one or more second transmission channels (Ch #2), wherein the one or more second transmission channels (Ch #2) are distinct from the first transmission channel (Ch #1) and from one another.

24 Claims, 3 Drawing Sheets

(56) References Cited

U.S. PATENT DOCUMENTS

| | | | | |
|---|---|---|---|---|
| 2006/0189275 A1* | 8/2006 | Karabinis | .......... | H04B 7/18521 |
| | | | | 455/12.1 |
| 2009/0074051 A1* | 3/2009 | Manapragada | ....... | H04L 65/607 |
| | | | | 375/240 |
| 2011/0164706 A1* | 7/2011 | Yokokawa | .......... | H04L 27/2602 |
| | | | | 375/340 |
| 2013/0243397 A1* | 9/2013 | Minnick | ................ | H04N 5/782 |
| | | | | 386/291 |
| 2014/0298397 A1* | 10/2014 | Pichot | ................ | H04N 21/2221 |
| | | | | 725/116 |
| 2015/0006586 A1* | 1/2015 | Mourad | ................ | H04H 20/95 |
| | | | | 707/793 |

\* cited by examiner

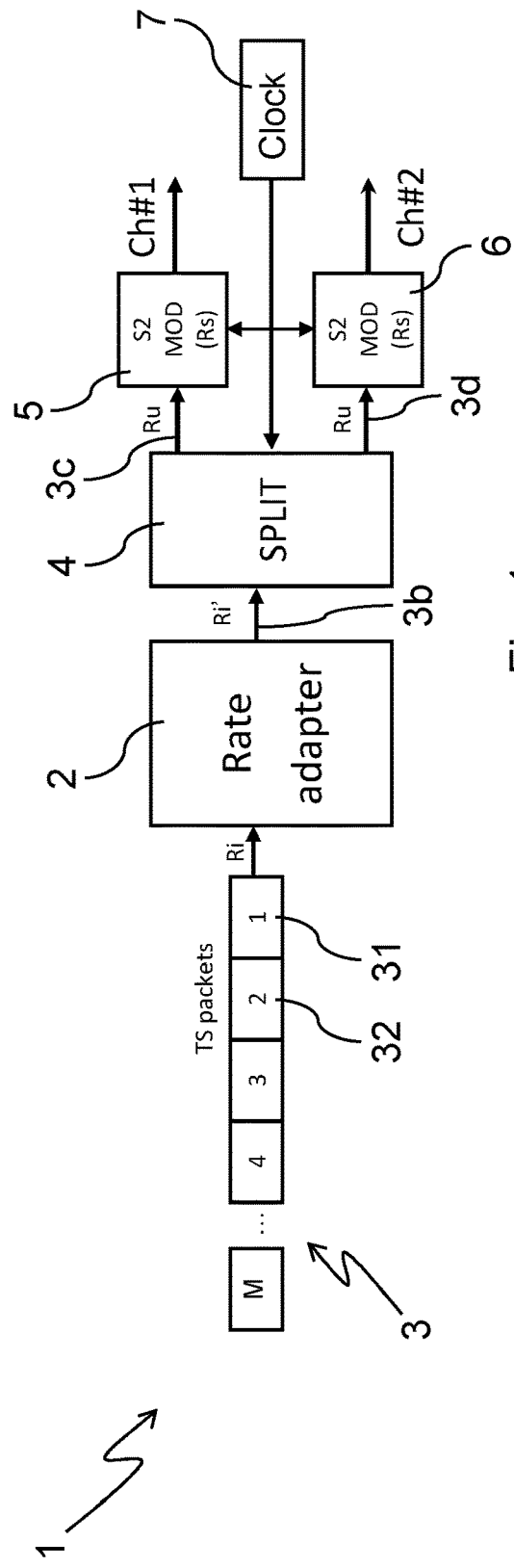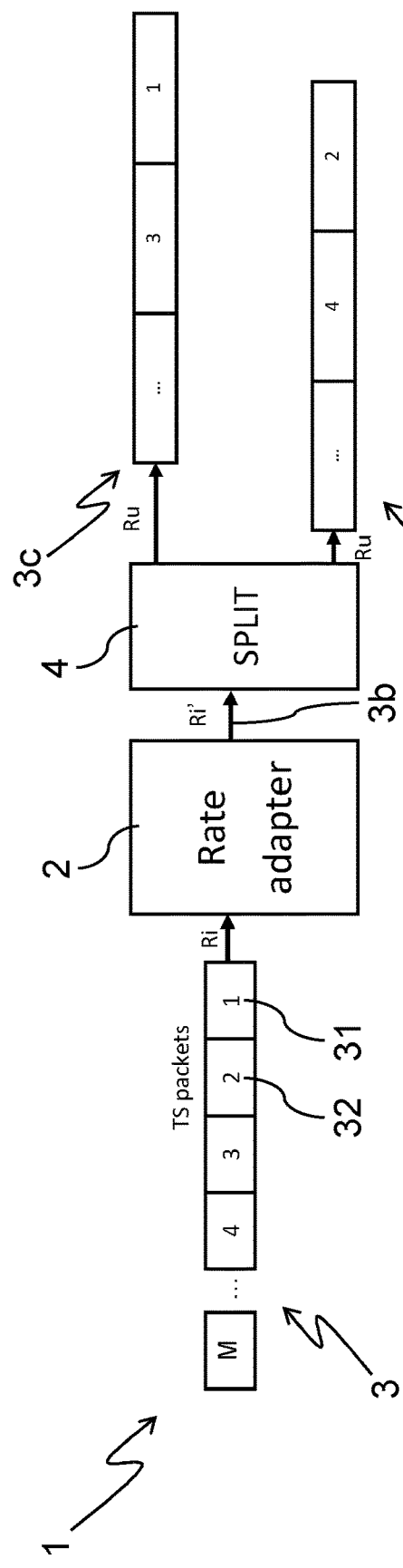

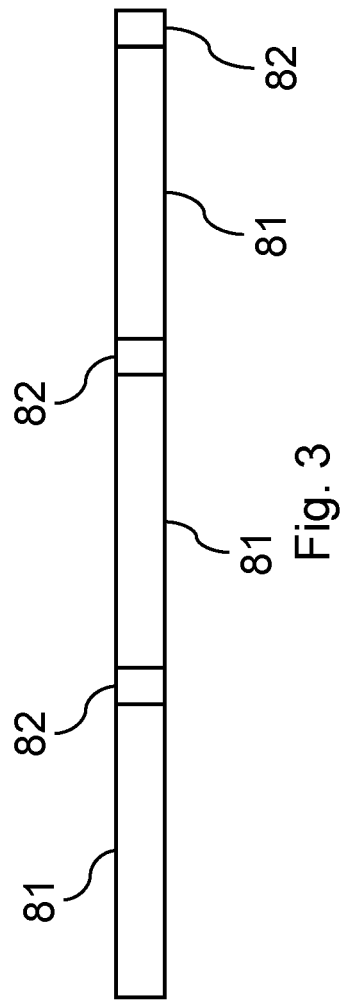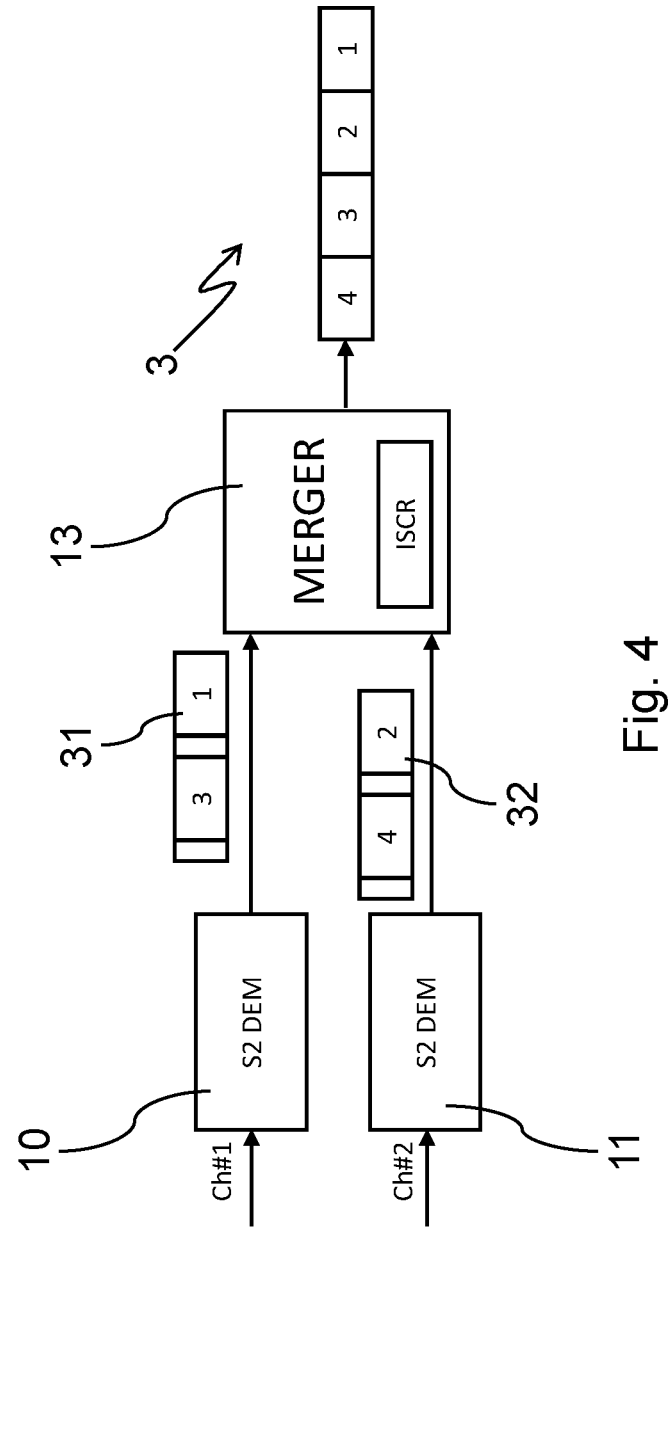

SYSTEM, DECODER, AND METHOD FOR TRANSMITTING SATELLITE SIGNALS

BACKGROUND OF THE INVENTION

1. Field of the Invention

The present invention relates to a transmission system, a receiver and a method for satellite signal transmission.

2. Present State of the Art

As is known, DVB-S2 is the second-generation standard for satellite transmissions that was defined by DVB in 2003. This standard was designed for various broadband satellite transmission applications, such as Standard Definition TeleVision (SDTV) and High Definition TeleVision (HDTV) broadcasting, interactive applications for home and professional users (e.g., Internet access), professional television contribution and SNG (Satellite News Gathering) services, distribution of TV signals to VHF/UHF digital-terrestrial transmitters, data and Internet site distribution (Internet trunking), and more.

A transmission system based on the DVB-S2 standard can accept any input data stream format (so long as it is digital), such as, for example, digital streams of the MPEG Transport Stream (MPEG-TS) type.

MPEG-TS digital streams may be either of the single or multiple type, i.e., they may, for example, transport one or more television/radio programs, interactive contents, or the like. To each MPEG-TS stream specific modulation parameters can be assigned, e.g., by using the Variable Coding & Modulation (VCM) technique, or, in point-to-point applications, the Adaptive Coding & Modulation (ACM) technique. For each new elementary data block, the latter allows changing the modulation scheme and consequently the error protection levels, thus optimizing the transmission system according to the user's reception conditions; such conditions may, in fact, change depending on weather conditions.

When the modulator is using the ACM technique, transmission delays may vary depending on the adaptive modulation/coding scheme. In order to solve this problem, the DVB-S2 standard provides for using a subsystem for synchronizing the input data stream (optional and not applicable to single MPEG-TS streams), which, through the transmission of a timing parameter from the modulator, ensures constant transmission bit rate and delay at the receiver of packet transmissions (as required, for example, for MPEG-TS streams).

According to the DVB-S2 standard, when the value of the ISSYI bit of the MATYPE field is 1, a 22-bit counter is activated in the modulator, which counts at a frequency equal to the symbol rate Rs of the modulator. In the modulator, the ISSY (Input Stream Synchronizer) field is appended to the end of each packet, is 2 or 3 bytes long, and comprises the ISCR (Input Stream Clock Reference) subfield containing the counter value at the instant when the packet enters the modulator. ISCR may be either long (22 bits) or short (15 bits); in this latter case, ISCR will contain the 15 least significant bits of the counter. The satellites currently in use operate on bands having a typical width of 33-36 MHz, which, in broadcasting applications, allow for transmission of data over a satellite transponder at a bit rate of the order of, for example, 60 Mbit/s.

The introduction of Ultra High Definition TeleVision (UHDTV) services, also referred to as 4K or 8K television, has required a transmission bit rate in the range of 17-20 Mbit/s for each television service to be transmitted. This makes it necessary to improve the utilization of the transmission/reception capacity provided by current satellites, minimizing the unused transmission/reception capacity of every single transponder.

At present, the DVB-S2 technology allows to transmit on a 33-36 MHz satellite channel an MPEG-TS stream containing 3 UHDTV programs by using "statistical multiplexing". An MPEG-TS stream containing multiple programs is also known as "multiplex".

Statistical multiplexing of video programs is a technique that allows splitting the available bit rate among the various programs to be transmitted, according to the instantaneous video coding requirements of each one of them. By using variable bit rate (VBR) coding, and taking into account that the bit rate required for obtaining a given quality from a video program is not constant over time but changes according to the type of image to be coded, and that, statistically, bandwidth request peaks are not simultaneous for the programs contained in the multiplex. Therefore, statistical multiplexing allows increasing the number of broadcast programs transmitted for the same total bit rate of the MPEG-TS. In fact, the gain offered by statistical multiplexing, expressed as the number of programs (or services) that can be included in the multiplex, increases with the ratio between the global bit rate of the MPEG-TS stream and the average bit rate required by a single program. This is because the lower the global bit rate of the MPEG-TS stream, the larger the unused capacity within the satellite multiplex.

SUMMARY OF THE INVENTION

The present invention aims at solving these and other problems by providing a transmission system, a receiver and a method for satellite signal transmission.

In particular, the present invention provides a method for satellite signal transmission that minimizes the unused transmission/reception capacity within a satellite communication channel.

The basic idea of the present invention is to transmit signals comprised in a data stream that comprises a first packet and one or more second packets, wherein the first packet is transmitted via a first transmission channel, whereas said one or more second packets are transmitted via one or more second transmission channels, wherein said one or more second transmission channels are distinct from the first transmission channel and from one another.

With reference to the above example, if a 120 Mbit/s MPEG-TS data stream is generated, it can be reasonably estimated that 7 or 8 UHDTV programs can be transmitted within the same multiplex by using statistical multiplexing, i.e., up to two more than could be transmitted with two 60 Mbit/s MPEG-TS streams.

The prior art does not allow, however, to split an MPEG-TS stream in transmission into several distinct streams to be transmitted on different satellite channels, and then to reconstruct said MPEG-TS stream on the receiver side.

In brief, the method according to the present invention allows to separate an MPEG-TS stream on the transmitter side into N streams to be transmitted on as many satellite transmission channels, and then to reconstruct the original MPEG-TS stream in the receiver after the N signals received have been properly demodulated. The following will describe an embodiment wherein the value N is 2.

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein:

FIG. 1 is a block diagram of a satellite signal transmission system according to the invention;

FIG. 2 shows an example of how the system of FIG. 1 splits the packets to be forwarded to the two modulators;

FIG. 3 illustrates one of the internal packet streams of a generic modulator;

FIG. 4 illustrates a decoder according to the invention;

DETAILED DESCRIPTION OF THE PREFERRED EMBODIMENTS

Figure 5:
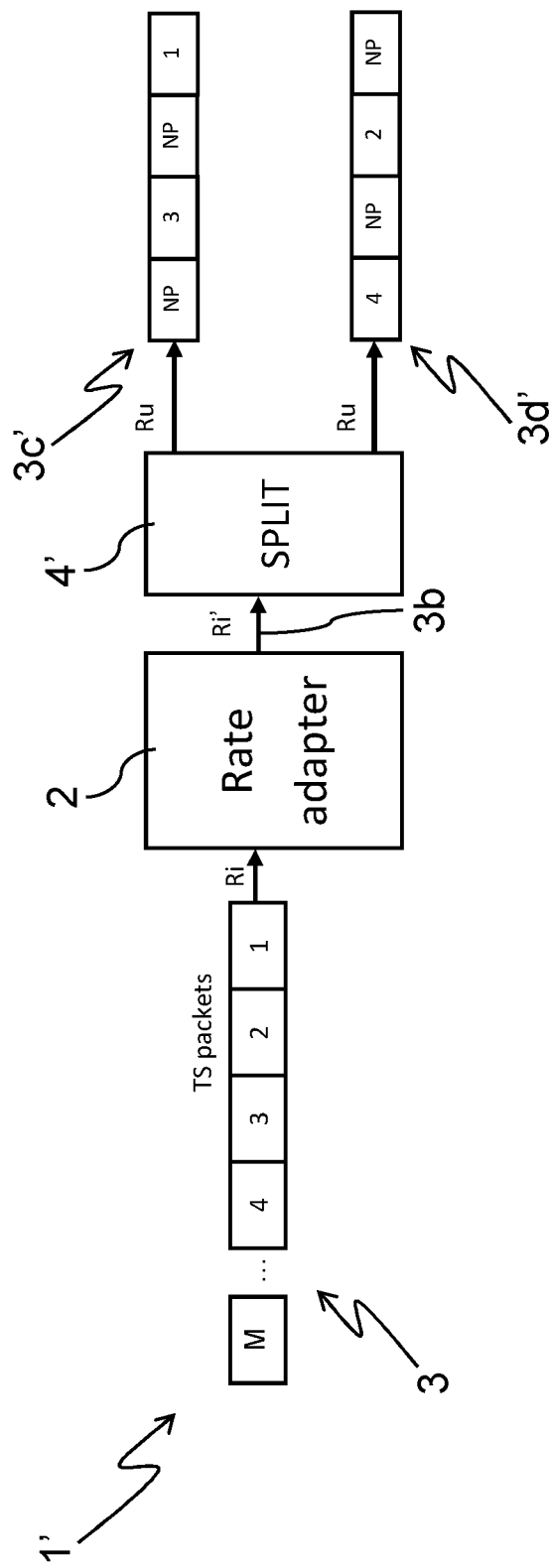
FIG. 5 illustrates a second embodiment of the satellite transmission system of FIG. 1.

With reference to FIG. 1, a transmission system 1 according to the invention, preferably compatible with the DVB-S2 standard, comprises at least a first modulator 5 and a second modulator 6, respectively transmitting on a first transmission channel Ch #1 and a second transmission channel Ch #2, distinct from each other, wherein said channels Ch #1,Ch #2 are preferably satellite channels. These channels, in fact, occupy distinct (non-overlapped) frequencies and/or different polarizations. Also, the signals transmitted on these transmission channels Ch #1,Ch #2 have preferably the same characteristics, i.e., the same bandwidth B, the same symbol rate Rs, and identical modulation and coding parameters.

The man skilled in the art will be able to use more than two modulators (and hence more than two transmission channels and the respective demodulators on the receiver side), without however departing from the teachings of the present invention.

The transmission system 1 also comprises the following elements:
  rate adapting means 2, also referred to as rate adapters, for providing rate adaptation as necessary;
  separating means 4, also referred to as splits, located downstream of the rate adapting means 2, if present, and in signal communication therewith;
  a reference clock 7, also referred to as clock, which beats the time and is in signal communication with the separating means 4 and the modulators 5,6.

The rate adapter is a subsystem that is generally present in a typical digital modulator, and that, as is known to those skilled in the art, adapts the bit rate Ri of an input MPEG-TS stream 3 so that the output stream will have a bit rate value suitable for use as input for said modulator according to the prior art, wherein this bit rate adaptation is made by inserting null packets. In the MPEG2-TS case, the rate adapter recalculates and updates all the time stamps included in the audio/video services.

In the application according to the present invention, the rate adapter 2 receives the input MPEG-TS stream 3 and outputs an adapted MPEG-TS stream 3b, which is then inputted to the split 4. In fact, the rate adapter 2 adapts the bit rate Ri of the MPEG-TS stream 3 to the total bit rate being transmitted by the N transmission channels Ch #1,Ch #2 (where N=2 in this example); more specifically, the bit rate Ri' at the output of the rate adapter 2, i.e., the bit rate of the adapted MPEG-TS stream 3b, will be equal to N*Ru, where Ru is the transmission rate, or bit rate, at which every single modulator (S2-MOD) 5,6 is transmitting. According to the invention, there are no other rate adapters downstream of the split 4. If no rate adapter is inserted in the chain because no adaptation is required, then the MPEG-TS stream 3 will directly enter the split 4, and the bit rate Ri' will coincide with Ri.

It should be noted that the modulators 5,6 will disable, if present, the transmission rate adaptation function, i.e., they will disable the rate adapter subsystem, which would otherwise perform the above-described adaptation on the respective pseudo stream. Furthermore, also the function for controlling the continuity of the input MPEG-TS packets (based on the value of the Continuity Counter field), which is normally present in modulators, may preferably be disabled.

Also with reference to FIG. 2, the split 4 separates the adapted input MPEG-TS stream into at least two pseudo streams 3c,3d (N pseudo streams), so that the first stream will contain, for example, the packets 1,3,5, . . . (1, 1+N, 1+2*N, . . . ), the i-th stream will contain the packets (i, i+N, i+2N, . . . ), the N-th stream will contain the packets 2,4,6 (N, 2N, 3N, . . . ); the streams will then be sent to the two (N) modulators 5,6, to be then transmitted on the transmission channels Ch #1 and Ch #2 (Ch #1, . . . , Ch # N).

Furthermore, a different distribution of the packets among the various channels, other than the one described herein, may be used. By using this different distribution among the channels, it will advantageously be possible to allocate more than one MPEG-TS stream in DVB-S2 Multiple Transport Stream mode, thereby minimizing the unused band, e.g., when two independent MPEG-TS multiplexes are transmitted by using three satellite transponders.

The MPEG-TS pseudo streams 3c,3d outputted by the split 4 have a bit rate Ru that is equal to the N-th fraction of the bit rate of the MPEG-TS stream Ri', i.e. Ru=Ri'/N, which in the example shown in FIGS. 1 and 2 is half the bit rate Ri'. Assuming that the i-th packet is sent to the modulator of the channel Ch # j at the instant t, the next packet (i+1) will be sent to the modulator of the next channel Ch #(j+1) with a delay equal to at least one symbol clock tick.

Differently from what is specified by the DVB-S2 standard, which does not provide for using the Input Stream Synchroniser (ISSY) in single MPEG-TS mode, in the present invention the modulators 5,6 will preferably activate the ISSY functionality by setting to 1 the ISSYI parameter in the MATYPE-1 byte of the base band header. In fact, when ISSYI is 1 the DVB-S2 standard requires that a 22-bit counter be activated in each modulator, which operates at a frequency equal to the symbol rate Rs of the modulator.

According to the above description, and also with reference to FIG. 3, within the generic DVB-S2 modulator each MPEG-TS stream is comprised of a sequence of packets 81, to each of which a final field 82 is appended. In the latter, either the whole current value of the counter (in ISSY long mode) or the 15 least significant bits of said current value (in ISSY short mode) are entered.

In operation, all counters are initially aligned and the modulators 5,6 are configured in the same ISSY mode, so that they are all in the ISSY long or ISSY short mode.

According to the DVB-S2 standard, the content of the ISCR field is used by the receiver to reconstruct the clock of the MPEG-TS stream at the modulator, so as to ensure a constant bit rate and a constant delay for every single stream.

In summary, the system 1 according to the invention provides a method for satellite transmission of digital signals that comprises the following steps:

a. splitting the data stream 3 into a first packet 31 and one or more second packets 32;

b. transmitting the first packet 31 via a first transmission channel Ch #1;

c. transmitting said one or more second packets 32 via one or more second transmission channels Ch #2, wherein said second transmission channels Ch #2 are distinct from the first transmission channel Ch #1 and from one another.

Also with reference to FIG. 4, which shows the case involving only two demodulators, a receiver 12 according to the invention comprises at least the following elements:

the first demodulator 10;
one or more second demodulators 11, preferably similar or equal to the first demodulator 10;
merging means 13, also referred to as mergers, arranged downstream of the first demodulator 10 and of the second demodulators 11 and in signal communication therewith.

The merger 13 performs a function which is the inverse of the function performed by the split 4. In operation, the merger 13 reads the content of the ISCR field appended to the packet 81 and, based on it, performs a time re-sorting operation on the packets received via N channels (in this example, the two channels Ch #1 and Ch #2) and demodulated and correctly timed by the demodulators 10 and 11, so as to obtain the original MPEG-TS packet stream. In particular, the merger block 13, after having realigned the two MPEG-TS streams, will join them together to form the original MPEG-TS stream, preferably on the basis of the content of the ISCR field transmitted in ISSY.

In the preferred embodiment, the merger 13 of the decoder 12 comprises a memory block for each one of the N inputs, such that it can accommodate the differential delay to be compensated for on the N satellite transmission channels.

A man skilled in the art may also use a different configuration of the memory blocks without however departing from the teachings of the present invention.

The two transmission channels must not necessarily occupy adjacent frequency positions, nor be transmitted on the same satellite or on satellites occupying the same orbital position.

In general, a geostationary satellite shows a small movement relative to the Earth over the 24 hours, which is due to its non-perfect orbital position. In fact, the distance between the Earth and the satellite, and hence the delay in the propagation of the signal on the radio route, varies with daily periodicity. When two satellites are used which are subject to different daily variations, it may happen that the alignment of the two signals at the demodulators' outputs undergoes such variations as to alter the original order of arrival of the packets. For the original MPEG-TS to be reconstructed, it is however necessary that the delays between the two streams are compatible with the maximum delays allowed by the memory block of the merger 13.

Of course, the example described so far may be subject to many variations.

A first variant is shown in FIG. 5; for simplicity, the following description will only highlight those parts which make this and the next variants different from the above-described main embodiment; for the same reason, wherever possible the same reference numerals, with the addition of one or more apostrophes, will be used for indicating structurally or functionally equivalent elements.

A transmission system 1', similar to the transmission system 1 described in the first embodiment, comprises a split 4' which is similar to the split 4 of the preceding embodiment.

The split 4' divides the MPEG-TS packets between the two (or among the N) channels just like the split 4, but the bit rate Ru of the two (N) pseudo streams outputted by said split 4' is equal to the bit rate Ri' of the stream 3b inputted to said split 4', i.e., Ru is equal to Ri'. This is possible by inserting a null packet (NP) into the pseudo stream 3c' in the place of each packet coming from the stream 3b and being sent to the pseudo stream 3d'. Likewise, a null packet is inserted into the pseudo stream 3d' in the place of each packet coming from the stream 3b and being sent to the pseudo stream 3c'. More in general, if the split 4' has to generate N output streams, for each packet selected from the stream 3b and sent to the generic pseudo stream, N–1 null packets will be added in the place of the packets sent to the other N–1 pseudo streams.

DVB-S2 includes the possibility, in the Multiple Transport Stream and Single/Multiple Generic Stream modes, of removing the null packets in transmission for better transmission efficiency, and then to properly reinsert them in reception. Correspondingly, the DVB-S2 standard offers the possibility of adding dummy frames for dealing with the absence of data to be transmitted. In the present invention, differently from the DVB-S2 standard, which does not include the possibility of removing null packets in the Single Transport Stream mode, the modulators 5,6 will activate a DVB-S2 Null Packet Deletion mode and, accordingly, the demodulators 10,11 will activate a DVB-S2 Null Packet Reinsertion mode for reinserting the null packets into their original positions. When these modes are active, the Dummy Frame Insertion mode must also be turned on in the modulators 5,6.

It must be pointed out that the DVB-S2 standard does not allow removing null packets and using dummy frames in transmission when a single MPEG-TS stream is transmitted. Therefore, implementing the present variant requires going beyond the specifications contained in the DVB-S2 standard. The merger of this variant (not shown in the annexed drawings) receives at its input all the pseudo streams 3c',3d' and performs a mutual time realignment of the streams 3c' and 3d' via the ISCR field. Afterwards, the merger selects a packet from one of the pseudo streams 3c',3d' based on the same logic used by the split 4' for generating the pseudo streams 3c',3d', and then reconstructs the stream 3.

According to a second variant, the re-sorting of the received MPEG-TS packets is carried out on the basis of the value of a field, preferably the Continuity Counter field, comprised in the header of the MPEG-TS packet 81 of each service contained in the MPEG-TS stream.

According to a third variant, the re-sorting of the received MPEG-TS packets is carried out on the basis of the content of a second field, preferably the PCR (Program Clock Reference) field of the header of the packet 81, of the MPEG-TS audio/video packets of each service contained in the MPEG-TS stream.

According to a fourth variant, the re-sorting of the received MPEG-TS packets is carried out on the basis of any combination of the preceding methods.

The invention claimed is:

1. A method for satellite broadcast signal transmission, comprising the steps of:

splitting a data stream into a first packet and one or more second packets, transmitting the first packet via a first transmission channel directly from a ground station to a first geosynchronous satellite transponder,
a step during which said one or more second packets are transmitted directly from the ground station to one or more second geosynchronous satellite transponders via one or more second transmission channels, wherein said one or more second transmission channels are distinct from said first transmission channel and from one another, and said first transmission channel and said one or more second transmission channels are all available at the same time,
wherein the first transmission channel is allocated on the first geosynchronous satellite transponder, and said one or more second transmission channels are allocated on said one or more second geosynchronous satellite transponders, and wherein said one or more second geosynchronous satellite transponders are distinct from said first geosynchronous satellite transponder and from one another, and said first geosynchronous satellite transponder and said one or more second geosynchronous satellite transponders do not communicate with each other,
wherein the first packet is comprised in a first pseudo stream, and the second packet is comprised in one or more second pseudo streams,
wherein the transmission rate of each pseudo stream equals the transmission rate of the data stream, and wherein, when each one of the packets of the data stream is added to one of the pseudo streams, a null packet is added to each one of the remaining pseudo streams.

2. The method according to claim 1, wherein the data stream is of the MPEG-TS type.

3. The method according to claim 2, wherein said transmission channels carry signals according to a DVB-S2 standard.

4. The method according to claim 1, wherein the first transmission channel uses a frequency position which is distinct from a second frequency position used by said one or more second transmission channels.

5. The method according to claim 4, wherein said transmission channels carry signals according to a DVB-S2 standard.

6. The method according to claim 1, wherein said transmission channels carry signals according to a DVB-S2 standard.

7. The method of claim 1, wherein a plurality of receivers receive the first packets and the one or more second packets from the first geosynchronous satellite transponder and the one or more second geosynchronous satellite transponders.

8. A system for satellite transmission of digital signals, comprising:
at least one first modulator,
wherein said digital signals are comprised in a data stream which, before being transmitted, is split into a first packet and one or more second packets,
wherein said first packet is transmitted through the first modulator directly to a first geosynchronous satellite transponder, and
at least one or more second modulators, through which the one or more second packets are transmitted directly to one or more second geosynchronous satellite transponders, and wherein said first and said one or more second geosynchronous satellite transponders are all available at the same time, and do not communicate with each other,
wherein the first packet is comprised in a first pseudo stream, the second packet is comprised in one or more second pseudo streams, and wherein the first pseudo stream has the same transmission rate as said one or more second pseudo streams,
wherein the transmission rate of each pseudo stream equals the transmission rate of the data stream, and
wherein, when each one of the packets of the data stream is added to one of the pseudo streams, a null packet is added to each one of the remaining pseudo streams.

9. The system according to claim 8, comprising separating means that generate the pseudo streams starting from the stream.

10. The system according to claim 9, wherein each modulator does not use a rate adaptation functionality.

11. The system according to claim 10, comprising rate adapting means arranged upstream of the separating means and in signal communication therewith, wherein said rate adapting means increase the rate of the data stream by inserting null packets.

12. The system according to claim 9, further comprising a reference clock in signal communication with said separating means and with the modulators.

13. The system according to claim 8, wherein the transmission rate of the data stream equals the sum of the transmission rates of all pseudo streams.

14. The system according to claim 8, wherein a Null Packet Deletion mode and a Dummy Frame Insertion mode are enabled in each modulator.

15. The system according to claim 8, wherein the transmission of the second packet is delayed, compared to the first packet, by at least the symbol time of the modulators.

16. The system according to claim 8, wherein each packet comprises an ISSY (Input Stream Synchronizer) field containing at least one value representing a time reference, and wherein said field has the same length in each packet.

17. The system according to claim 16, wherein the values of the time reference of the modulators can be set to one same value.

18. The system according to claim 16, comprising a reference clock in signal communication with said separating means and with the modulators.

19. The system according to claim 8, wherein said modulators transmit signals according to DVB-S2 standard.

20. The system of claim 8, wherein a plurality of receivers receive the first packets and the one or more second packets from the first geosynchronous satellite transponder and the one or more second geosynchronous satellite transponders.

21. A satellite broadcast receiver comprising:
at least one first demodulator, wherein said receiver is configured to demodulate signals comprised in a data stream which, before being transmitted, was split into a first packet comprises in a first pseudo stream and one or more second packets comprised in one or more second pseudo streams, wherein the transmission rate of each pseudo stream equals the transmission rate of the data stream, and wherein, when each one of the packets of the data stream is added to one of the pseudo streams, a null packet is added to each one of the remaining pseudo streams, wherein said first packet, which is transmitted through a first geosynchronous satellite transponder, is received through the first demodulator,
one or more second demodulators through which the one or more second packets, which were directly transmitted through one or more second geosynchronous satellite transponders, are received, wherein said first and said one or more second geosynchronous satellite transponders are all available at the same time, and do not communicate with each other, and merging means arranged downstream of the first demodulator and of the second demodulator, wherein said merging means are in signal communication with said first demodulator and said one or more second demodulators, and wherein said merging means joins the first packet and said one or more second packets and outputs the data stream.

22. The receiver according to claim 21, wherein the packets comprise an ISSY (Input Stream Synchronizer) field containing at least one value through which the merging means can execute a time re-sorting operation on said packets.

23. The receiver according to claim 21, wherein the packets are of the MPEG-TS type, and wherein the merging means can execute a second time re-sorting operation on said packets based on the values contained in the Continuity Counter and/or PCR fields.

24. A receiver according to claim 21, wherein said demodulators receive signals according to a DVB-S2 standard.

* * * * *